United States Patent [19]
Grogan

[11] 4,014,195
[45] Mar. 29, 1977

[54] PILLAR LOCK
[75] Inventor: Robert D. Grogan, Brookfield, Wis.
[73] Assignee: Briggs & Stratton Corporation, Wauwatosa, Wis.
[22] Filed: June 14, 1976
[21] Appl. No.: 695,990
[52] U.S. Cl. .............................. 70/379 R; 403/353
[51] Int. Cl.² ..................................... E05B 17/04
[58] Field of Search ............ 70/380, 379 R, 379 A; 403/353, 166; 24/221 K

[56] References Cited
UNITED STATES PATENTS

| | | | |
|---|---|---|---|
| 2,605,631 | 8/1952 | Jacobi | 70/379 R |
| 2,660,046 | 11/1953 | Jacobi | 70/379 R |

FOREIGN PATENTS OR APPLICATIONS

| | | | |
|---|---|---|---|
| 763,601 | 8/1953 | United Kingdom | 24/221 K |

*Primary Examiner*—Paul R. Gilliam
*Assistant Examiner*—Kenneth J. Dorner
*Attorney, Agent, or Firm*—Ira Milton Jones & Associates

[57] ABSTRACT

A cylinder lock has a socket portion formed integrally with the rear end of its cylinder for connection with a flat stamped shaft. The shaft has an enlarged head at its front end and a medial enlargement defining forwardly facing shoulders. The socket has a cavity in which the shaft head is rotatable, a noncircular bore opening rearwardly from the cavity through which the head can be inserted forwardly into the cavity in one position of shaft rotation, and grooves opening forwardly to the cavity in which the head is receivable upon rearward motion of the shaft in another position of its rotation. A coiled expansion spring reacting between said shoulders and the rear of the socket confines the head in said grooves.

5 Claims, 7 Drawing Figures

U.S. Patent  Mar. 29, 1977  4,014,195
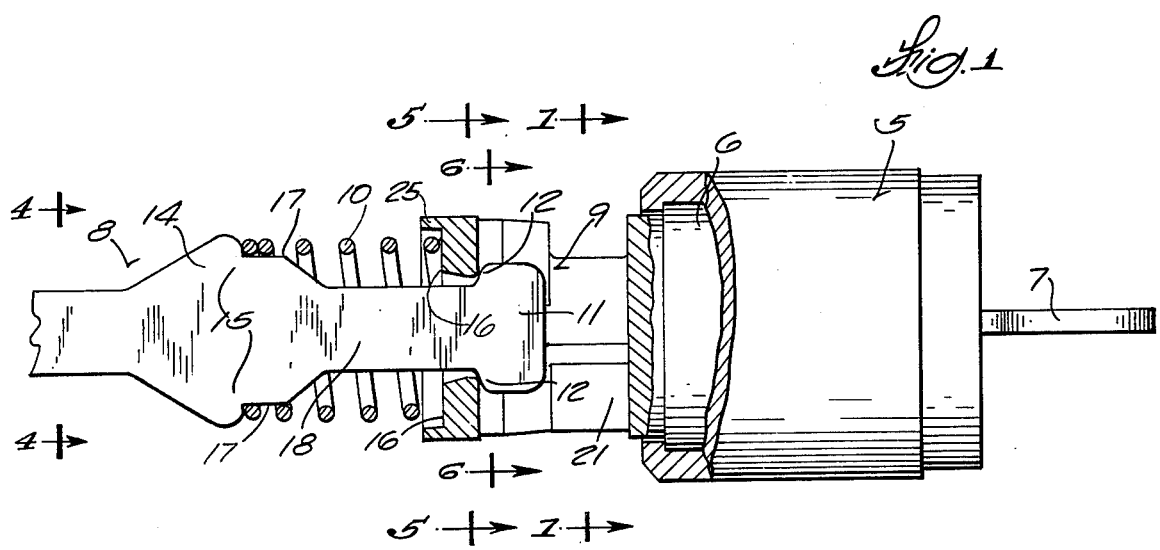
Fig. 1
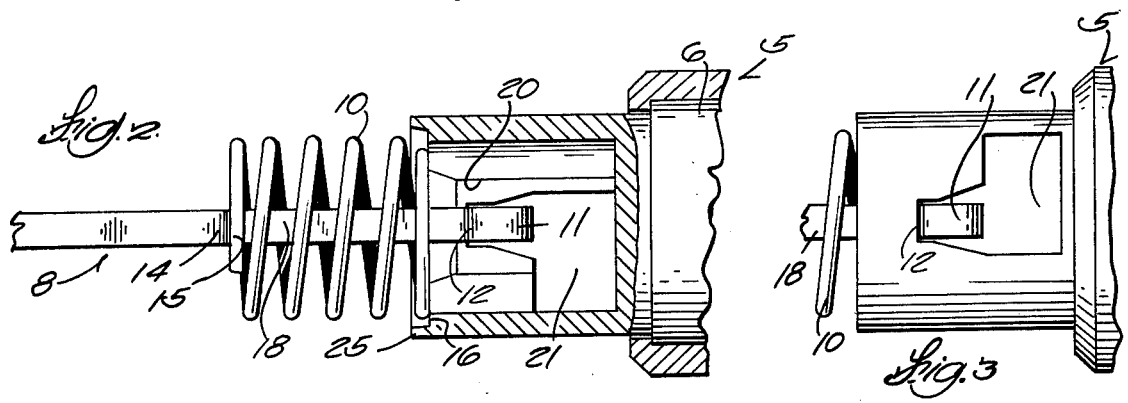
Fig. 2
Fig. 3
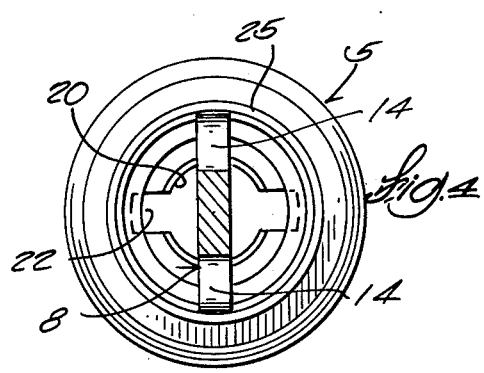
Fig. 4
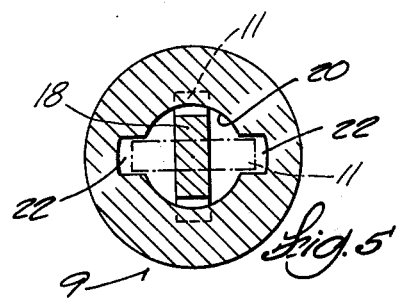
Fig. 5
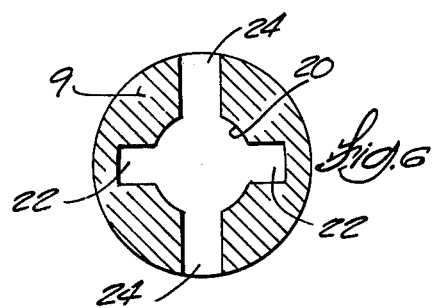
Fig. 6
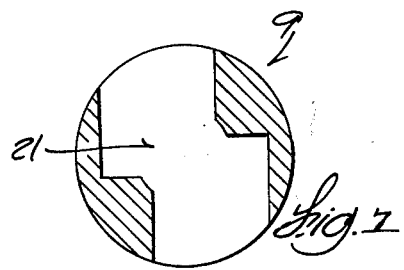
Fig. 7

PILLAR LOCK

This invention relates to cylinder locks for automobile doors and similar applications and is more particularly concerned with a lock mechanism of the type wherein key produced rotation of a lock cylinder is transmitted to a latch mechanism by means of a shaft.

Cylinder locks of the type to which this invention relates are sometimes referred to as pillar locks and are extensively used in automobile door and rear deck installations. Such a lock is characterized by a driving or operating shaft that projects rearwardly from its cylinder and serves to transmit torque from the cylinder to a latch mechanism to be actuated. It is very desirable that the shaft be so connected with the lock cylinder that the rear end of the shaft can have limited swinging motion in all directions, to accommodate some degree of misalignment between the lock cylinder installation and the latch mechanism with which it cooperates.

Inasmuch as pillar locks are produced in large volume and must sell at the lowest possible cost, simplicity and ease of manufacture and assembly are important requirements in such locks. To minimize manufacturing costs, the shaft should preferably be of such form that it can be made as a sheet metal stamping. The body of the lock cylinder, to which the shaft is attached, is usually made as a die casting; and while the die casting process lends itself to the production of relatively intricate shapes, the cylinder body should be so formed for its connection with the shaft that it can be die cast without the need for unusual or elaborate coring or other expedients that would complicate the dies or the die casting process.

The mechanism should of course be as compact as possible, but it must nevertheless be sturdy enough to endure intense and prolonged vibration as well as other abuse. Finally, in any lock mechanism intended for automotive applications, the several parts of the mechanism must be prevented from rattling against one another.

Pillar locks which to some extent meet the requirements set forth above are disclosed in U.S. Pat. Nos. 2,655,028 and 2,660,046, both to E. N. Jacobi. However, the lock mechanisms of those patents embodied features which adapted them for certain specialized situations but which otherwise complicated them to some extent and made them more expensive than necessary for most purposes. The lock cylinder in the mechanism of U.S. Pat. No. 2,655,028 was biased to a neutral or key receiving position of rotation, and to provide for such bias, the mechanism was so constructed that its assembly tended to be rather complicated for unskilled labor. The mechanism of U.S. Pat. No. 2,660,046 comprised a relatively large number of parts, cooperating to afford a detent-defined key receiving position of the cylinder.

By contrast, the general object of the present invention is to provide a simple and straightforward pillar lock mechanism that meets the requirements set forth above, can be manufactured at minimal cost with inexpensive dies and tooling, and can be quickly and easily assembled by unskilled labor.

A more specific object of the invention is to provide a pillar lock mechanism having a stamped shaft projecting rearwardly from its lock cylinder for transmitting torque from the cylinder to a latch mechanism, said shaft being free for limited swinging motion in all directions relative to the cylinder and having a connection with the cylinder that is maintained effective by a spring which further serves to prevent rattling between the cylinder and the shaft and also tends to hold the shaft in coaxial relation to the cylinder.

Another specific object of the invention is to provide a pillar lock mechanism of the character described which comprises merely a simple shaft that can be readily made as a stamping, a socket portion on the lock cylinder that can be formed integrally with the cylinder body, and a coiled expansion spring, those components being so arranged that they can be assembled into a complete mechanism in one simple operation that can be easily performed by persons having minimal manual dexterity.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate one complete example of an embodiment of the invention constructed according to the best mode so far devised for the practical application of the principles thereof, and in which:

FIG. 1 is a view mainly in side elevation, but with portions shown broken away, of a cylinder lock mechanism and its connected rotation transmitting shaft, embodying the principles of this invention;

FIG. 2 is a view taken at right angles to the plane of FIG. 1, the lock casing and the socket portion of the lock cylinder being shown mainly in longitudinal section and all other parts being shown in plan view;

FIG. 3 is a fragmentary plan view showing the connection between the shaft and the socket portion of the lock cylinder;

FIG. 4 is a view taken on the plane of the line 4—4 in FIG. 1;

FIG. 5 is a sectional view taken on the plane of the line 5—5 in FIG. 1;

FIG. 6 is a sectional view taken on the plane of the line 6—6 in FIG. 1 but with the shaft omitted; and FIG. 7 is a sectional view taken on the plane of the line 7—7 in FIG. 1.

Referring now more particularly to the accompanying drawings, the numeral 5 designates a lock casing having a bore therethrough in which a key actuatable lock cylinder 6 is confined to rotation. The lock cylinder is conventional in comprising a body that may be formed as a die casting and wherein there is a tumbler mechanism (not shown) by which the cylinder is normally locked in one position of rotation. A proper key 7, inserted axially into a key slot that opens to the front of the cylinder, actuates the tumbler mechanism to an unlocked condition in which the cylinder is rotatable in the casing 5 by means of the key. Normally the lock cylinder is rotatable between defined limits and the key is held captive in the cylinder when the latter is between those limits, but the key can be inserted and withdrawn when the cylinder is in at least one of its limit positions.

The cylinder cooperates with a latch mechanism (not shown) which is mounted in rearwardly spaced relation to the cylinder and which, like the tumbler mechanism in the cylinder, can take any of a number of different forms, all of which are well known. The latch mechanism is in a latching or locking condition when the cylinder is in a key receiving position of its rotation and is unlocked or unlatched by rotation of the cylinder to its other limit position. For the latch mechanism to function in this manner, rotation of the cylinder must of course be transmitted to a part of the latch mechanism, and a shaft 8 connected with the cylinder serves for such torque transmission.

The shaft 8 is connected with the cylinder by means of a socket portion 9 that is fixed to the cylinder at its rear end and can comprise an integral part of the cylinder body die casting. The connection between the cylinder and the shaft also comprises a coiled expansion spring 10 that surrounds a portion of the shaft and reacts between the shaft and the socket portion 9, as explained hereinafter.

The shaft 8 is preferably formed as a simple flat stamping that can be symmetrical about a longitudinal centerline. Along most of its length the shaft can have a uniform width, as measured from one longitudinal side edge to the other. A wider head 11 on the front end of the shaft is received within the socket 9 on the cylinder and has a pair of edge portions 12 that define laterally opposite rearwardly facing shoulders. Spaced a distance to the rear of the head is a substantially widened medial portion 14 of the shaft that defines a pair of forwardly facing shoulders 15 which serve as a seat for a rear end of the expansion spring 10. At its front end the expansion spring bears against the rear face 16 of the socket. The widened medial portion of the shaft includes a pilot portion that has parallel side edges 17 which extend forwardly from the shoulders 15 and which are spaced apart by a distance such that the spring embraces them rather snugly, to confine the rear end of the spring against radial motion relative to the shaft and also maintain the spring engaged with the shoulders 15 and preassembled with the shaft before the shaft is installed in the socket portion 9.

Between its head 11 and its medial enlargement 14, the shaft has a neck 18 which is narrower than either of those enlargements and can be of the same width as most of the remainder of the shaft. Note that the rearwardly facing shoulders 12 on the head project laterally out from the neck.

The socket means 9 on the rear of the cylinder has a concentric bore 20 that opens to its rear face 16. The diameter of the bore 20 is large enough to receive the neck 18 of the shaft with substantial clearance but is smaller than the width of the head 11. At its front end this bore opens to a cavity 21 which is large enough to receive the head 11 and to accommodate rotation thereof through a quarter of a revolution about the shaft axis. To enable the head to enter the cavity 21, the socket portion also has a pair of axially extending grooves 22 which open radially inwardly to the bore 20 at diametrically opposite sides thereof and which open lengthwise to the rear face 16 of the socket portion and to the cavity 21. The head 11 can therefore be moved forwardly into the cavity 21 when the shaft is in a position of rotation such that laterally opposite portions of the head are received in the axially extending grooves 22, and it will be understood that the width of each of those grooves is slightly greater than the thickness of the shaft.

The socket 9 also has a pair of radially elongated grooves 24, at diametrically opposite sides of the bore and opening endwise into it, which open forwardly into the cavity. These radial grooves 24 are adapted to receive the shaft head in consequence of its being moved rearwardly into them from the cavity 21, but they are in angularly offset relation to the axially extending grooves 22 and preferably extend lengthwise at right angles to the plane containing the axial grooves. Therefore, after the head of the shaft has been moved forwardly into the cavity 21, the shaft must be rotated 90° about its axis relative to the socket means in order for the shaft to be moved rearwardly so that its head can be seated in the radial grooves 24.

It will be apparent that once the head of the shaft is engaged in the radial grooves 24, it is confined in them under the rearward force which the spring 10 exerts upon the shaft, whereby the forwardly facing shoulders 12 on the head are maintained engaged with the bottoms of those grooves. It will also be apparent that when the head is thus confined in the radial grooves 24, the shaft is constrained to rotate with the cylinder as well as being held against rattling.

However, the shaft is free to have limited swinging motion about its head, to accommodate substantial misalignment between the lock cylinder 6 and a latch mechanism part to which the rear end of the shaft is to be connected. To provide for such swinging, the bore 20 in the socket is rearwardly flared or frusto-conical. To accommodate flatwise swinging of the shaft —or, more accurately, of its head — the side surfaces of the radial grooves 24 are beveled to be forwardly divergent. To accommodate edgewise swinging of the shaft, the rearwardly facing shoulders 12 on the head are somewhat rounded and have a forward and laterally outward inclination, so that they can rock on the bottom surfaces of the radial grooves 24.

The side edges 17 on the pilot portion of the shaft, in addition to preventing disengagement of the spring from the forwardly facing shoulders 15, also cooperate with those shoulders and the spring to urge the shaft towards a position in which its axis or longitudinal centerline is aligned with the axis of the cylinder. The front end of the spring is held concentric to the socket means by an integral circumferential flange or land 25 on the socket means, projecting rearwardly beyond its flat rear surface 16 and embracing the front coil of the spring.

Since the cavity 21 in the socket can open radially to the cylindrical surface thereof, at diametrically opposite sides of the socket, it will be apparent that the socket can be formed as an integral part of the cylinder body die casting with the use of simple coring and without need for any machining. Assembly of the shaft 8 to the cylinder 6 merely involves installing the spring 10 around the neck 18 of the shaft, establishing the shaft in a position of rotation relative to the cylinder in which the head 11 aligns with the axially extending grooves 22, inserting the shaft axially into the socket until the head is received in the cavity 21, then rotating the shaft a quarter turn and allowing the spring to carry the shaft rearwardly and engage the head in the radial grooves 24.

From the foregoing description taken with the accompanying drawings it will be apparent that this invention provides a very simple and inexpensive pillar lock assembly having a stamped shaft capable of being connected with the lock cylinder in a very facile manner and capable of limited swinging motion in all directions to accommodate misalignment between the lock cylinder and a latch mechanism to be controlled thereby, the connection between said shaft and the lock cylinder being maintained effective by means of a coiled expansion spring that also serves to prevent rattling of the parts.

Those skilled in the art will appreciate that the invention can be embodied in forms other than as herein disclosed for purposes of illustration.

The invention is defined by the following claims:

I claim:

1. A lock mechanism of the type comprising a lock cylinder rotatable in a casing by means of a proper key that is axially insertable into the cylinder from a front end thereof, and a shaft projecting rearwardly from the cylinder for transmitting rotation of the cylinder to a latch mechanism, said lock mechanism being characterized by:

A. the shaft being substantially flat and having
      1. an enlarged head at a front end thereof that has edge portions spaced to opposite sides of the axis of the shaft to define rearwardly facing shoulders,
      2. another enlargement spaced to the rear of said head and having edge portions spaced to opposite sides of the shaft axis to define forwardly facing shoulders, and
      3. an elongated neck portion connecting said other enlarged portion with said head;
   B. socket means fixed on the rear end portion of the cylinder and having a rear face formed to provide a spring seat, said socket means also having
      1. a concentric bore opening to said rear face and in which said neck portion is rotatably receivable,
      2. a cavity spaced forwardly of said rear face, to which said bore opens at its front end and in which said head is rotatably receivable,
      3. radially extending grooves at opposite sides of the bore which open forwardly to said cavity and endwise into said bore and in which said head is receivable in one position of rotation of the shaft relative to the socket means, said rearwardly facing shoulders being cooperable with the bottoms of said grooves to confine the shaft against rearward movement relative to the socket means, and said grooves being cooperable with said head to confine the shaft in said one position of rotation relative to the socket means while permitting the shaft to have limited flatwise and edgewise swinging motion, and
      4. an axially extending groove opening to said bore along the whole length thereof and which is in angularly offset relation to said radially extending grooves, said axially extending groove providing for insertion of the shaft into the socket means, to enable said head to be inserted into the cavity when said shaft is in another position of rotation relative to the socket means; and
   C. a coiled expansion spring surrounding said neck portion and reacting between said spring seat on the socket means and said forwardly facing shoulders to confine the head in said radially extending grooves.

2. A lock mechanism of the type comprising a lock cylinder rotatable in a casing by means of a proper key that is axially insertable into the cylinder from a front end thereof, and a shaft projecting rearwardly from the cylinder for transmitting rotation of the cylinder to a latch mechanism to be actuated, said lock mechanism being characterized by:

A. the shaft being substantially flat and having
      1. an elongated neck portion near a front end thereof,
      2. an enlarged coplanar head on the front end of said neck portion having edge portions that project beyond the opposite edges of the neck portion to provide a pair of rearwardly facing shoulders, and
      3. another coplanar enlarged portion at the rear of the neck portion having edge portions that project beyond the opposite edges of the neck portion to provide forwardly facing shoulders;
   B. socket means fixed on the rear end portion of the cylinder and having
      1. a bore concentric with the cylinder and opening to a rear face of the socket means, said bore being of a diameter to rotatably receive the neck portion of the shaft,
      2. a cavity spaced forwardly of the rear face of the socket means and to which said bore opens forwardly, said cavity being of a size to rotatably receive said head,
      3. a pair of longitudinally extending grooves opening radially inwardly to said bore from opposite sides thereof and extending axially from said rear face of the socket means to said cavity, said grooves being of a size to receive said head in one position of rotation of the shaft, to enable the head to be passed forwardly into the cavity, and
      4. a pair of radially extending grooves opening forwardly to said cavity and extending radially outwardly from said bore, said radially extending grooves being in angularly offset relation to said longitudinally extending grooves, to be entered by said head upon its being rotated in the cavity and moved rearwardly, and cooperating with the head to confine the shaft against rearward and rotational movement relative to the cylinder while permitting the shaft to have limited swinging movement about its head in all directions; and
   C. a coiled expansion spring surrounding said neck portion and reacting between the rear face of said socket means and said forwardly facing shoulders to bias the shaft rearwardly relative to the cylinder and thus maintain said rearwardly facing shoulders engaged against the bottoms of said radially extending grooves.

3. The lock mechanism of claim 2 wherein said first mentioned shoulders are inclined forwardly and edgewise outwardly from the neck portion to facilitate edgewise swinging of the shaft.

4. The lock mechanism of claim 2 wherein said radially extending grooves have forwardly divergent opposite surfaces to accommodate flatwise swinging of the shaft.

5. The lock mechanism of claim 2 wherein said shaft has a widened pilot portion forwardly adjacent to said rearwardly facing shoulders and to the rear of said neck portion, and wherein the rear coils of said expansion spring snugly embrace said pilot portion to hold the expansion spring preassembled with the shaft before the shaft is assembled with said socket means.

* * * * *